Dec. 28, 1937.  M. SOMOHANO  2,103,384
NONBLURRABLE MIRROR
Filed Jan. 21, 1935
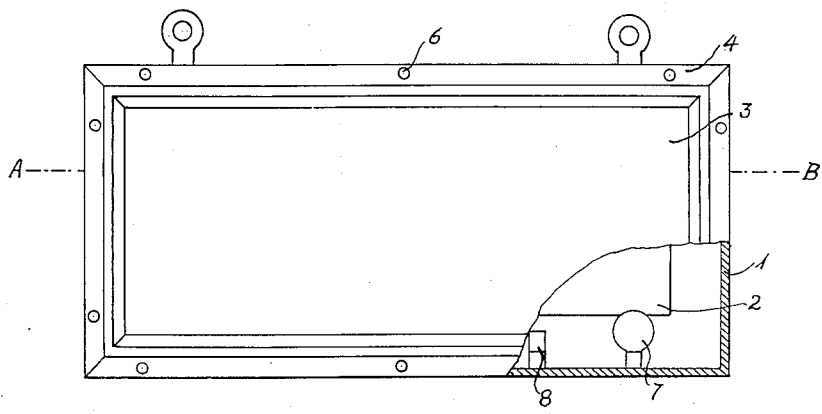
FIG. I
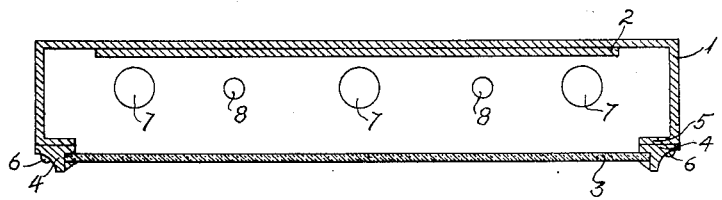
FIG. II
INVENTOR
M. Somohano Patented Dec. 28, 1937

2,103,384

UNITED STATES PATENT OFFICE 2,103,384

NONBLURRABLE MIRROR

Manuel Somohano, Mexico, D. F., Mexico

Application January 21, 1935, Serial No. 2,823
In Mexico February 6, 1934

1 Claim. (Cl. 88—73)

This invention relates to a non-blurrable mirror to be used in bath rooms and the like, where the presence of water vapor tends to blurr it.

The device, according to my invention, may have any desired shape, and the embodiment shown in the accompanying drawing is merely by way of example.

Referring to the drawing:

Fig. I is a front elevation of the apparatus where the surface has been broken away in part, to show the interior thereof.

Fig. II is a transverse section on the line A—B of Fig. I.

The apparatus consists of a housing 1 of relatively little depth with relation to its length and height and in the interior of said housing and in the bottom thereof, there is a mirror 2 with its reflecting surface facing inwardly.

The housing is open at its front part but the opening is covered by means of a pane of glass 3 fixed to a frame 4, fitted to the edge 5 of the housing and attached to the same by means of the bolts 6.

Along at least one of the side walls of the housing and between the mirror and the glass plate, there are one or more electric lamps 7 positioned so that light therefrom is reflected through the plate 3 by the mirror 2, and alternating with said lamps, there is a series of resistor elements 8.

The heat produced by the lamps and the resistor elements prevents the mirror and the transparent glass of the cover from becoming blurred. The resistor elements, of course, can be eliminated if the electric lamps furnish the necessary high temperature in the apparatus.

Having described the above invention, I claim:

A non-blurrable bath room mirror comprising a housing of relatively little depth with relation to its length and height, one of the large walls of the housing being a transparent plate; in the interior of said housing and adjacent to the wall opposite to the transparent plate, a mirror with its reflecting surface facing inwardly so as to reflect light through the transparent plate of the opposite side; and a row of electric lamps along at least one of the interior sides of the housing, to heat the transparent plate that covers the housing, and to produce the light to be reflected by the mirror.

M. SOMOHANO.